US012083790B2

(12) United States Patent
Yamamoto

(10) Patent No.: US 12,083,790 B2
(45) Date of Patent: Sep. 10, 2024

(54) PRINTING APPARATUS

(71) Applicant: SEIKO EPSON CORPORATION, Tokyo (JP)

(72) Inventor: Kazutaka Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 18/048,932

(22) Filed: Oct. 24, 2022

(65) Prior Publication Data

US 2023/0131777 A1 Apr. 27, 2023

(30) Foreign Application Priority Data

Oct. 26, 2021 (JP) ................................ 2021-174417

(51) Int. Cl.
*B41J 11/70* (2006.01)
*B41J 11/00* (2006.01)

(52) U.S. Cl.
CPC .......... *B41J 11/70* (2013.01); *B41J 11/00224* (2021.01)

(58) Field of Classification Search
CPC ........................................................ B41J 11/70
See application file for complete search history.

(56) References Cited

U.S. PATENT DOCUMENTS 6,394,675 B1 * 5/2002 Sodeyama ............. B41J 11/703 400/54

FOREIGN PATENT DOCUMENTS

JP 2001-38974 A 2/2001

* cited by examiner

*Primary Examiner* — Justin Seo
(74) *Attorney, Agent, or Firm* — WORKMAN NYDEGGER

(57) ABSTRACT

A printing apparatus includes a transportation roller that transports recording paper in a transporting direction, a head that performs printing on the recording paper, a cutter that has a second blade located at a position facing an opening located downstream in the transporting direction of the head and the transportation roller and a first blade configured to move from the opening to the second blade and configured to cut the recording paper together with the second blade, and a flap that has a shutter configured to open and close the opening and is configured to move between a first position and a second position, and when the first blade moves from the opening to the second blade, the flap moves from the first position to the second position, and the shutter opens the opening, and when the first blade moves away from the second blade, the flap moves from the second position to the first position, and the shutter closes the opening.

4 Claims, 4 Drawing Sheets

PRINTING APPARATUS

The present application is based on, and claims priority from JP Application Serial Number 2021-174417, filed Oct. 26, 2021, the disclosure of which is hereby incorporated by reference herein in its entirety.

BACKGROUND

1. Technical Field

The present disclosure relates to a printing apparatus.

2. Related Art

As illustrated in JP-A-2001-38974, an apparatus including a shutter that opens and closes an opening through which a movable blade of a cutter advances and retreats, in which the movable blade abuts on the shutter to open the opening has been known.

Since, in the apparatus described above, the movable blade abuts on the shutter, a failure of the movable blade may be caused.

SUMMARY

The present disclosure is a printing apparatus including a transportation roller that transports recording paper in a transporting direction, a head that performs printing on the recording paper, a cutter that has a second blade located at a position facing an opening located downstream in the transporting direction of the head and the transportation roller, and the cutter having a first blade configured to move from the opening to the second blade and configured to cut the recording paper together with the second blade, and a flap that has a shutter configured to open and close the opening, and the flap configured to move between a first position and a second position, in which when the first blade moves from the opening to the second blade, the flap moves from the first position to the second position, and the shutter opens the opening, and when the first blade moves away from the second blade, the flap moves from the second position to the first position, and the shutter closes the opening.

DESCRIPTION OF EXEMPLARY EMBODIMENTS

1. First Embodiment

1-1. Configuration of Printing Apparatus

Hereinafter, a printing apparatus 1 according to an embodiment will be described with reference to FIGS. 1 to 4. Note that a description will be given while directions in the figures will be described using a three-dimensional coordinate system. For convenience of explanation, a positive direction of the Z-axis is referred to as upward or simply as up, a negative direction thereof is referred to as downward or simply as down, a positive direction of the X-axis is referred to as a right direction or simply as right, a negative direction thereof is referred to as a left direction or simply as left, and a positive direction of the Y-axis is referred to as a rear direction or simply as rear, and a negative direction thereof is referred to as a front direction or simply as front.

The printing apparatus 1 according to the embodiment is, for example, used for a point of sale (POS) system. The POS system is used for operation in the retail industry such as sales at a shopping center, a department store, and a convenient store, sales aboard a train, and the like and the food service industry such as sales at a restaurant, a café, and a bar, and the like. The POS system has a function of printing a receipt, a coupon, a ticket, a label, and the like according to the product and service. Hereinafter, a receipt, a coupon, a ticket, a label, and the like are referred to as a print. The user operates the POS system, sends printing data to the printing apparatus 1 from a computer, prints the print by the printing apparatus 1 and delivers the print to the customer or attaches the print to a product.

Figure 1:
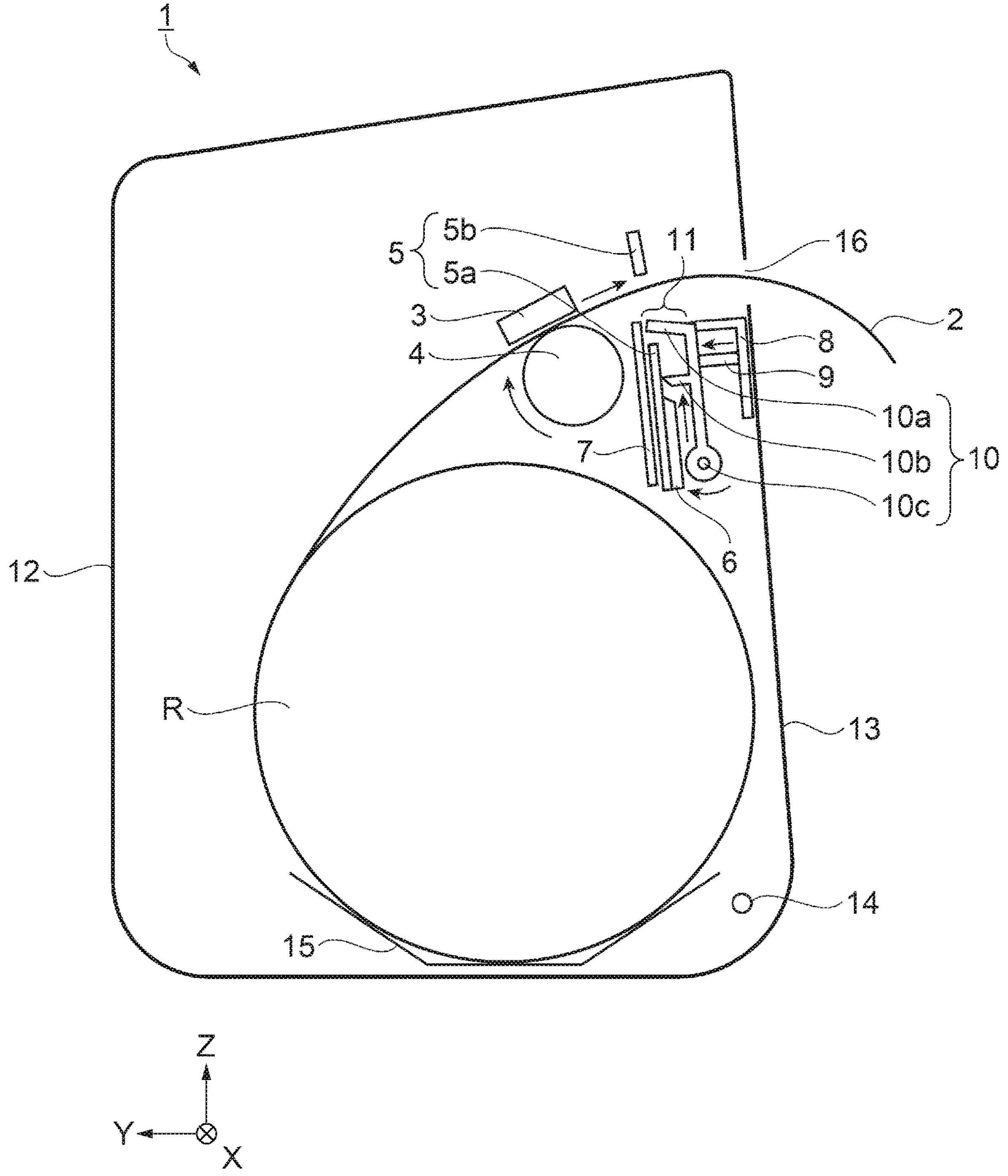
FIG. 1 is a sectional view illustrating a configuration of a printing apparatus.

As illustrated in FIG. 1, the printing apparatus 1 includes a transportation roller 4, a head 3, a cutter 5 having a first blade 5*a* and a second blade 5*b*, and a flap 10 having a shutter 10*a* and a projection 10*b*. A case 12 is provided with a hinge 14 at a position downward and in a front direction. The cover 13 is mounted so as to be rotatable around the hinge 14. On the case 12, the head 3, the second blade 5*b* of the cutter 5, and a storage 15 described later are mounted. On the other hand, on the cover 13, the transportation roller 4, the first blade 5*a* of the cutter 5, the flap 10, a first guide 7, and a second guide 8 described later are mounted.

Recording paper 2 is, for example, elongated thermal paper. In addition, the recording paper 2 may be a so-called die cut label having a surface on which a plurality of regular size labels is stuck on a mount. Alternatively, the recording paper 2 may be an elongated and continuous label without a mount and is a so-called liner-less label. In the case of a liner-less label, the surface of the transportation roller 4 is processed with non-adhesive processing such as silicone resin processing so that paste does not stick on the surface.

Rolled paper R in which the recording paper 2 is wound can be stored in the storage 15 that is disposed downward in the case 12. The cover 13 can open and close the storage 15. The user can access to the storage 15 by opening the cover 13 toward the front. The user opens the cover 13, stores the rolled paper R in the storage 15, draws the recording paper 2 from the rolled paper R, and closes the cover 13 to set the recording paper 2 in the printing apparatus 1.

When the cover 13 is closed, the transportation roller 4 mounted on the cover 13 is located at a position facing the head 3 mounted on the case 12 across the recording paper 2. As a result, the transportation roller 4 can transport the recording paper 2, and the head 3 can perform printing on the recording paper 2. In addition, the first blade 5*a* of the cutter 5 mounted on the cover 13 is located at a position facing the second blade 5*b* mounted on the case 12 across the recording paper 2 and can cut the recording paper 2. Moreover, when the cover 13 is closed, a discharge port 16 having a rectangular shape is formed at the boundary of the cover 13 and the case 12.

The head 3 is, for example, a line type thermal head in which a plurality of thermal elements is arranged in a lateral direction. The plurality of thermal elements in the head 3 is selected based on printing data and generates heat, and prints an image on the recording paper 2 that is thermal paper. The transportation roller 4 rotates clockwise as illustrated by the arrow by a motor for a transportation roller (not illustrated). The transportation roller 4 draws the recording paper 2 from the rolled paper R in the storage 15 and transports the recording paper 2 in the transporting direction illustrated by the arrow from the head 3 to the cutter 5. The transportation roller 4 located at a position facing the head 3 via the recording paper 2 is also called a platen roller.

Note that the printing apparatus 1 may include a pressing mechanism that presses the head 3 toward the transportation roller 4. The recording paper 2 is pressed, between the head 3 and the transportation roller 4, by a prescribed pressure by the pressing mechanism. In this state, as the transportation roller 4 rotates, a prescribed friction force is generated between the recording paper 2 and the transportation roller 4, and the recording paper 2 is transported.

The cutter 5 is disposed downstream in the transporting direction with respect to the positions of the head 3 and the transportation roller 4. The cutter 5 includes the first blade 5*a* and the second blade 5*b* located at mutually facing positions. The recording paper 2 is transported by the transportation roller 4 so as to pass between the first blade 5*a* and the second blade 5*b*. As illustrated in FIG. 1, the second blade 5*b* is disposed above the recording paper 2, and the first blade 5*a* is disposed below the recording paper 2. The first blade 5*a* moves toward the second blade 5*b* by a mother for a cutter (not illustrated), blade edges of the first blade 5*a* and the second blade 5*b* cross each other so as to be able to cut the recording paper 2 between the first blade 5*a* and the second blade 5*b*.

The first guide 7 is disposed upstream of the cutter 5, with respect to the transporting direction, and downstream of the head 3 and the transportation roller 4. The second guide 8 is disposed upstream of the discharge port 16, with respect to the transporting direction, and downstream of the cutter 5. Therefore, the first guide 7 and the second guide 8 are located between the head 3 and the transportation roller 4, and the discharge port 16. The first guide 7 and the second guide 8 can be mounted so as to support the recording paper 2, from below, that has been transported by the transportation roller 4.

An opening 11 is formed between the first guide 7 and the second guide 8. Since the first guide 7 is located downstream of the head 3 and the transportation roller 4, the opening 11 is located downstream in the transporting direction of the head 3 and the transportation roller 4. In addition, the first guide 7 and the second guide 8 are located between the head 3 and the transportation roller 4, and the discharge port 16, the opening 11 is also located between the head 3 and the transportation roller 4, and the discharge port 16.

The second blade 5*b* of the cutter 5 is located at a position above the opening 11 and facing the opening 11. The first blade 5*a* of the cutter 5 can advance and retreat from the opening 11. When the first blade 5*a* does not cut the recording paper 2, the first blade 5*a* is retreated at a position below the opening 11 and where the first blade 5*a* retreats from the opening 11. Hereinafter, the position of the first blade 5*a* at this time will be referred to as a retreating position. When the first blade 5*a* cuts the recording paper 2, the first blade 5*a* advances upward from the opening 11, moves toward the second blade 5*b*, and cuts the recording paper 2 together with the second blade 5*b*. Hereinafter, the position of the first blade 5*a* at this time will be referred to as a cutting position. After cutting the recording paper 2, the first blade 5*a* moves away from the second blade 5*b* and returns to the retreating position.

The cutter 5 includes a holder 6 that can move together with the first blade 5*a* and supports the first blade 5*a*. The holder 6 is coupled to a transfer mechanism that transfers power of a motor for a cutter. Since the first blade 5*a* is thin, when the first blade 5*a* is directly coupled to the transfer mechanism, a force is applied, the first blade 5*a* may be deformed or damaged. For this reason, the first blade 5*a* is configured to be coupled to the transfer mechanism via the holder 6. Note that the transfer mechanism includes a gear and the like and converts a rotary motion of the motor for a cutter into a linear motion so that the first blade 5*a* and the holder 6 vertically move.

The flap 10 has the shutter 10*a* that can open and close the opening 11, the projection 10*b* that abuts on the holder 6 of the first blade 5*a* of the cutter 5 and moves, and a shaft 10*c* that rotatably supports the flap 10. The flap 10 is rotatably fixed to the cover 13 at one end by the shaft 10*c*, and the shutter 10*a* is formed at another end. The projection 10*b* is formed between the shaft 10*c* and the shutter 10*a*. One end of the flap 10 is fixed and is a so-called fixed end. Another end of the flap 10 is movable and is a so-called free end. As described later, the flap 10 can move between a first position and a second position. In FIG. 1, the flap 10 is located at the first position. An elastic member 9 is mounted between the second guide 8 and the flap 10. The elastic member 9 is, for example, a spring or a rubber. The elastic member 9 presses the projection 10*b* of the flap 10 toward the first blade 5*a* of the cutter 5 and the holder 6.

Figure 2:
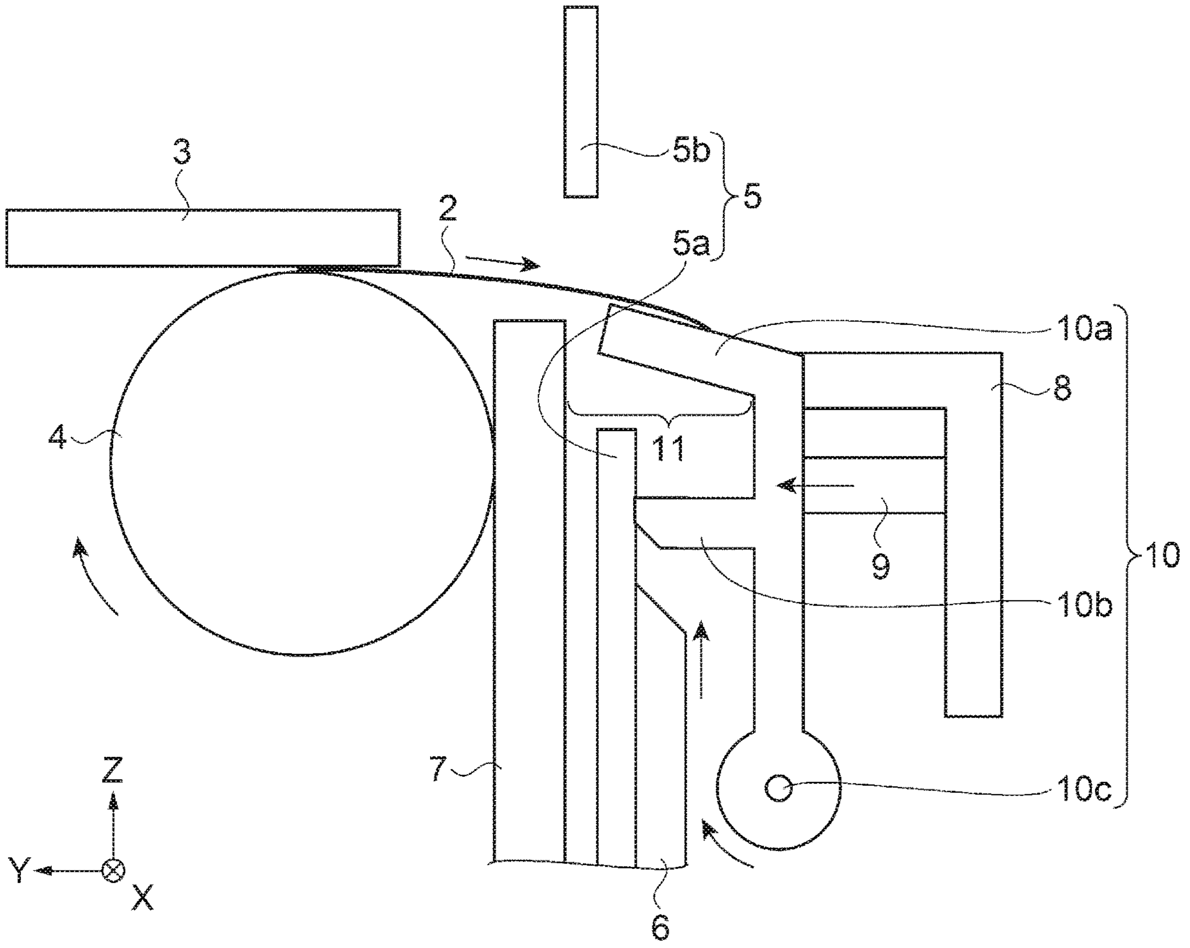
FIG. 2 is a schematic view illustrating a flap at a first position where an opening is closed by the shutter.
Figure 3:
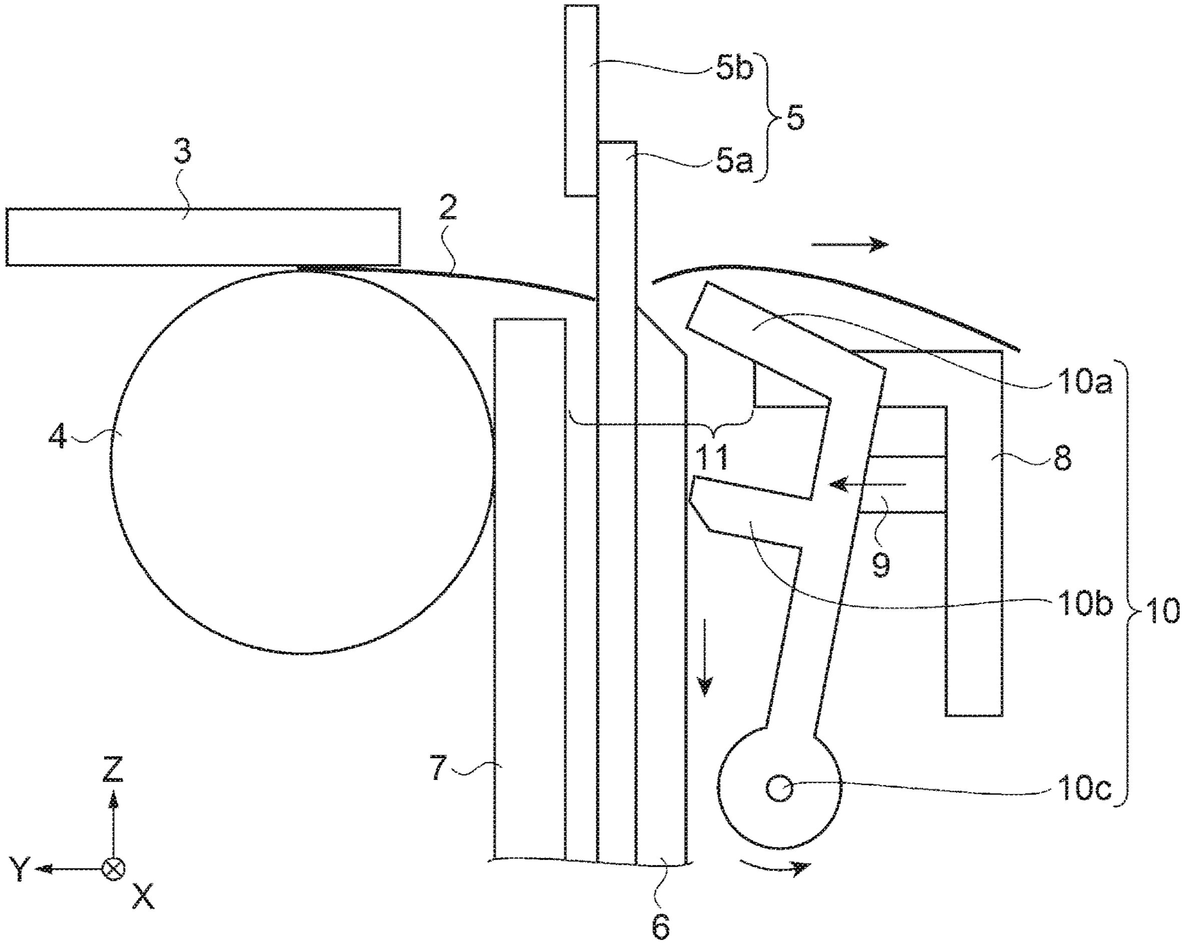
FIG. 3 is a schematic view illustrating the flap at a second position where the opening is opened by the shutter.

With reference to FIGS. 2 and 3, the flap 10 will be described in detail. First, the position of each portion of the flap 10 will be described. The shaft 10*c* is located downstream in the transporting direction of the first blade 5*a* of the cutter 5 and the holder 6 and upstream of the second guide 8. The projection 10*b* projects toward the first blade 5*a* and the holder 6. The shutter 10*a* extends upstream in the transporting direction so as to cover the opening 11.

Since the flap 10 is located downstream in the transporting direction of the first blade 5*a* of the cutter 5, the distance between the head 3 and the transportation roller 4, and the cutter 5 can be shortened. After the head 3 prints a receipt or the like on the recording paper 2, the cutter 5 can immediately cut the recording paper 2, and the recording paper 2 can be suppressed from being wasted. The recording paper 2 needs to be cut by the cutter 5 at a position of the rear end of the recording paper 2 on which a receipt or the like is printed. For this reason, the recording paper 2 needs to be transported by the transportation roller 4 until the rear end of the recording paper 2 after being printed exceeds the position of the cutter 5, but the transportation distance is short.

As illustrated in FIG. 2, the first position of the flap 10 is a position where the shutter 10*a* closes the opening 11. Hereinafter, the position of the shutter 10*a* at this time will be referred to as a closing position. As the shutter 10*a* closes the opening 11, the leading end of the recording paper 2 that has been transported by the transportation roller 4 is suppressed from entering the opening 11. In addition, the rear end of the recording paper 2 that has been cut by the cutter 5 is also suppressed from entering the opening 11. At this time, the first blade 5*a* of the cutter 5 is located at the retreating position.

In addition, as illustrated in FIG. 3, the second position of the flap 10 is a position where the shutter 10*a* opens the opening 11. Hereinafter, the position of the shutter 10*a* at this time will be referred to as an opening position. As the shutter 10*a* opens the opening 11, the first blade 5*a* of the cutter 5 can advance upward from the opening 11 and can cut the recording paper 2.

As illustrated in FIG. 2, when the flap 10 is located at the first position, the projection 10*b* is located at a position separated from the holder 6 of the first blade 5*a* of the cutter 5 and is not abutted on the holder 6. By a pressing force of the elastic member 9, the flap 10 is held at a position where the projection 10*b* abuts on a surface of the first blade 5*a*. As a result, the shutter 10*a* is also held at the closing position. Note that the flap 10 is configured by resin such as plastic resin, and even if the projection 10*b* abuts on the first blade 5*a*, wear of the first blade 5*a* can be suppressed.

Here, operation of the shutter 10*a* of the flap 10 for opening the opening 11 when the first blade 5*a* moves from the opening 11 to the second blade 5*b* for cutting the recording paper 2, that is, when the first blade 5*a* moves from the retreating position to the cutting position will be described. As illustrated in FIG. 2, the flap 10 is located at the first position, and the shutter 10*a* closes the opening 11. It is assumed that the first blade 5*a* of the cutter 5 located at the retreating position starts moving in a direction toward the opening 11 and a direction toward the second blade 5*b*.

As the first blade 5*a* moves toward the opening 11, the holder 6 supporting the cutter 5 also moves. Then, the holder 6 reaches a position immediately before a position where the holder 6 abuts on the projection 10*b* of the flap 10. The end portion of the holder 6 where the holder 6 abuts on the projection 10*b* has a gently sloped surface. In addition, the end portion of the projection 10*b* where the projection 10*b* abuts on the holder 6 also has a gently sloped surface. The ends having the sloped surfaces of the holder 6 and the projection 10*b* abut on each other.

As the holder 6 further moves, the holder 6 and the projection 10*b* slide on each other's surfaces. The elastic member 9 presses the flap 10 so that the flap 10 moves toward the first position. The holder 6 resists the pressing force of the elastic member 9 and pushes up the projection 10*b* so that the projection 10*b* moves toward the front portion of the printing apparatus 1. At this time, by the projection 10*b* that is pushed up and moves toward the front portion, the flap 10 rotates clockwise around the shaft 10*c* and moves. With the movement of the flap 10, the shutter 10*a* moves from upstream to downstream in the transporting direction and opens the opening 11 that has been closed.

When the projection 10*b* rides on the plane surface from the sloped surface of the holder 6, the projection 10*b* stops moving, and the flap 10 also stops moving. Note that even after the flap 10 stops moving, the first blade 5*a* moves to the cutting position, and thus the holder 6 moves while the plane surface of the holder 6 abuts on the projection 10*b*.

As a result, as illustrated in FIG. 3, the first blade 5*a* moves to the cutting position and cuts the recording paper 2 together with the second blade 5*b*. The flap 10 moves to the second position illustrated in FIG. 3. In this manner, when the first blade 5*a* moves from the opening 11 to the second blade 5*b*, the holder 6 of the first blade 5*a* abuts on the projection 10*b* and moves the flap 10 from the first position to the second position, and the shutter 10*a* moves so as to open the opening 11. That is, when the first blade 5*a* of the cutter 5 moves from the retreating position to the cutting position, the holder 6 supporting the first blade 5*a* abuts on the projection 10*b* of the flap 10, moves the flap 10 from the first position to the second position, and moves the shutter 10*a* of the flap 10 from the closing position to the opening position.

Next, operation of the shutter 10*a* of the flap 10 for closing the opening 11, after cutting the recording paper 2, when the first blade 5*a* moves away from the second blade 5*b*, that is, when the first blade 5*a* moves to return from the cutting position to the retreating position. As illustrated in FIG. 3, the flap 10 is located at the second position, and the shutter 10*a* opens the opening 11. It is assumed that the first blade 5*a* of the cutter 5 at the cutting position starts moving in a direction away from the second blade 5*b* and in a direction of returning to the retreating position.

When the first blade 5*a* moves away from the second blade 5*b*, the holder 6 supporting the cutter 5 also moves. The holder 6 moves while causing the plane surface of the holder 6 to abut on the projection 10*b* of the flap 10. Then, the holder 6 reaches a position immediately before the position where the holder 6 is separated from the projection 10*b*.

As the holder 6 further moves, the holder 6 and the projection 10*b* slide on each other's sloped surfaces. By the pressing force of the elastic member 9, the holder 6 pushes down the projection 10*b* so that the projection 10*b* moves toward the rear portion of the printing apparatus 1. At this time, by the projection 10*b* that is pushed down and moves toward the rear portion, the flap 10 rotates counterclockwise around the shaft 10*c* and moves. With the movement of the flap 10, the shutter 10*a* moves from downstream to upstream in the transporting direction and closes the opening 11.

When the projection 10*b* is separated from the holder 6 and abuts on the surface of the first blade 5*a*, the projection 10*b* stops moving, and the flap 10 also stops moving. Note that even after the flap 10 stops moving, the first blade 5*a* moves to the retreating position, and thus the first blade 5*a* moves while causing the plane surface of the first blade 5*a* to abut on the projection 10*b*.

As a result, as illustrated in FIG. 2, the first blade 5*a* returns to the retreating position, and the flap 10 returns to the first position. In this manner, as the first blade 5*a* moves away from the second blade 5*b*, the holder 6 is separated from the projection 10*b* of the flap 10 and moves the flap 10 from the second position to the first position, and the shutter 10*a* closes the opening 11. That is, when the first blade 5*a* of the cutter 5 moves from the cutting position to the retreating position, the holder 6 supporting the first blade 5*a* is released from abutting on the projection 10*b* of the flap 10, moves the flap 10 from the second position to the first position, and moves the shutter 10*a* of the flap 10 from the opening position to the closing position.

By the way, the shutter 10*a* of the flap 10 is configured so as not to interfere with the peripheral parts when moving between the closing position illustrated in FIG. 2 and the opening position illustrated in FIG. 3. Therefore, a slight gap may be generated between the shutter 10*a* at the closing position, and the first guide 7 and the second guide 8. In addition, a small step may be generated between the shutter 10*a*, and the first guide 7 and the second guide 8. In particular, when corners that are both ends of the leading end of the recording paper 2 that has been transported abut on such a gap and a step, the corners may be caught. As a result, the recording paper 2 may be jammed in a portion around the shutter 10*a* and the like.

Figure 4:
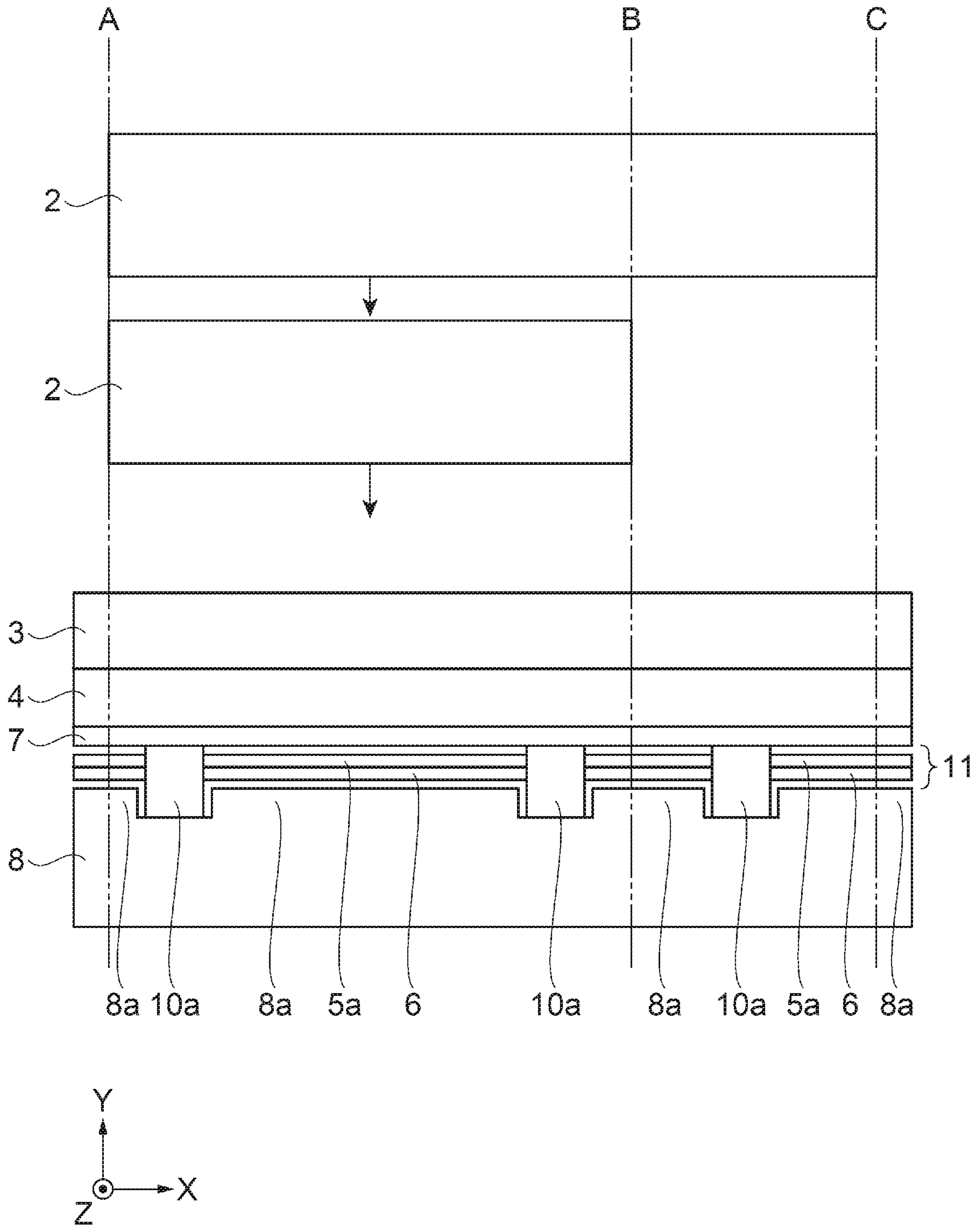
FIG. 4 is a schematic view of the shutter viewed from above.

The printing apparatus 1 is capable of coping with the recording paper 2 having a plurality of paper widths. For example, FIG. 4 illustrates the recording paper 2 having two kinds of paper widths with which printing apparatus 1 can cope. Note that the shutter 10*a* is located at the closing position and closes the opening 11 in the transporting direction. The paper width of the recording paper 2 illustrated in the upper part of FIG. 4 extends from a position A to a position C and is, for example, 80 mm. Each end of the recording paper 2 in a paper width direction is located at the position A and the position C. The paper width of the recording paper 2 illustrated in the lower part of FIG. 4 extends from the position A to a position B and is, for example, 58 mm. Each end of the recording paper 2 in the paper width direction is located at the position A and the position B. In addition, in order to position the rolled paper R having a plurality of paper widths, it is configured that a partition plate can be installed in the storage 15 according to each paper width.

As illustrated in FIG. 4, a plurality of the shutters 10*a* of the flap 10 is arranged in a direction intersecting with the transporting direction of the recording paper 2 indicated by the arrow and in the paper width direction of the recording paper 2. The plurality of shutter 10*a* is disposed at a plurality of positions, respectively, avoiding the positions A, B, and C, which are the ends of the two kinds of recording paper 2 in the paper width direction. That is, since the shutters 10*a* are not disposed at the positions A, B, and C, which are the ends of the two kinds of recording paper 2, in the paper width direction, with which the printing apparatus 1 can cope, there is no gap or step, at these positions, generated between each shutter 10*a*, and the first guide 7 and the second guide 8.

As a result, the corners of the recording paper 2 that has been transported can be suppressed from being caught in a gap or a step generated between the shutter 10*a*, and the first guide 7 and the second guide 8. Accordingly, the recording paper 2 can be suppressed from being jammed in a portion around the shutter 10*a* and the like. Note that the leading end exclusive of the corners of the recording paper 2 abuts on a plurality of the shutters 10*a* and advances in the transporting direction while being corrected so as to be parallel to the shutters 10*a*. Therefore, the corners of the recording paper 2 can be suppressed from entering the opening 11.

In addition, in the second guide 8, at positions corresponding to the positions A, B, and C, which are the ends of the two kinds of recording paper 2 in the paper width direction, projected portions 8*a* extend from downstream to upstream in the transporting direction. The plurality of shutters 10*a* and the plurality of projected portions 8*a* are alternately arranged in the paper width direction of the recording paper 2.

With such a configuration, for example, even when the recording paper 2 is diagonally transported, the corners of the recording paper 2 abut on the projected portions 8*a* or the shutters 10*a*, and the recording paper 2 is suppressed from entering the opening 11. Thereafter, the leading end of the recording paper 2 exclusive of the corners abuts on the plurality of shutters 10*a* and advances in the transporting direction while being corrected so as to be parallel to the shutters 10*a*. As a result, the recording paper 2 can be suppressed from entering the opening 11, and the recording paper 2 can be suppressed from being jammed.

According to the printing apparatus 1 of the above-described embodiment, the flap 10 is moved with the movement of the first blade 5*a*, which is a movable blade of the cutter 5 that advances and retreats from the opening 11, and the shutter 10*a* of the flap 10 is moved. As a result, in the printing apparatus 1, the first blade 5*a* does not abut on the shutter 10*a*, and a failure of the first blade 5*a* is not caused.

Although the embodiments have been described thus far with reference to the drawings, specific configurations are not limited to these embodiments, and the configurations may be changed, replaced, and deleted without departing from the gist of the present disclosure.

In the example described above, the head 3 is a thermal head, but any printing method may be used. For example, the head 3 may be an ink jet head. In this case, since an ink jet head cannot pinch the recording paper 2 by coming into contact with the transportation roller 4, a driven roller that faces the transportation roller 4 and pinches the recording paper 2 may be mounted on the case 12.

In addition, the example described above, when each shutter 10*a* of the flap 10 is moved, the holder 6 of the first blade 5*a* of the cutter 5 is used. It may be configured that, instead of the holder 6, by any one of a link mechanism, a cam mechanism, a rack and pinion mechanism, and the like using rotation of the gear of the transfer mechanism of the cutter 5 or a combination thereof, the shutter 10*a* of the flap 10 moves between the opening position and the closing position.

In addition, in the example described above, the recording paper 2 that has been transported by the transportation roller 4 is mounted by the first guide 7 and the second guide 8. As long as the recording paper 2 can be mounted using the shutter 10*a* of the flap 10, one or both of the first guide 7 and the second guide 8 do not have to be present.

What is claimed is:

1. A printing apparatus comprising:
- a transportation roller that transports recording paper in a transporting direction;
- a head that performs printing on the recording paper;
- a cutter that has a second blade located at a position facing an opening located downstream in the transporting direction of the head and the transportation roller, and the cutter having a first blade configured to move from the opening to the second blade and configured to cut the recording paper together with the second blade; and
- a flap that has a shutter configured to open and close the opening, and the flap configured to move between a first position and a second position, wherein
- when the first blade moves from the opening to the second blade, the flap moves from the first position to the second position, and the shutter opens the opening, and
- when the first blade moves away from the second blade, the flap moves from the second position to the first position, and the shutter closes the opening; and
- a holder that is configured to move together with the first blade and supports the first blade, wherein
- the flap has a projection configured to abut on the holder,
- as the first blade moves from the opening to the second blade, the holder abuts on the projection and moves the flap from the first position to the second position, and the shutter opens the opening, and
- as the first blade moves away from the second blade, the holder is separated from the projection of the flap and moves the flap from the second position to the first position, and the shutter closes the opening.

2. A printing apparatus comprising:
- a transportation roller that transports recording paper in a transporting direction;
- a head that performs printing on the recording paper;
- a cutter that has a second blade located at a position facing an opening located downstream in the transporting direction of the head and the transportation roller, and the cutter having a first blade configured to move from the opening to the second blade and configured to cut the recording paper together with the second blade; and a flap that has a shutter configured to open and close the opening, and the flap configured to move between a first position and a second position, wherein when the first blade moves from the opening to the second blade, the flap moves from the first position to the second position, and the shutter opens the opening, and when the first blade moves away from the second blade, the flap moves from the second position to the first position, and the shutter closes the opening, wherein when the flap moves from the second position to the first position, the shutter moves from downstream to upstream in the transporting direction and closes the opening.

3. The printing apparatus according to claim 1, wherein the flap is configured to move, around a shaft, between the first position and the second position and is pressed by an elastic member to move toward the first position.

4. A printing apparatus comprising:

a transportation roller that transports recording paper in a transporting direction;

a head that performs printing on the recording paper;

a cutter that has a second blade located at a position facing an opening located downstream in the transporting direction of the head and the transportation roller, and the cutter having a first blade configured to move from the opening to the second blade and configured to cut the recording paper together with the second blade; and a flap that has a shutter configured to open and close the opening, and the flap configured to move between a first position and a second position, wherein when the first blade moves from the opening to the second blade, the flap moves from the first position to the second position, and the shutter opens the opening, and when the first blade moves away from the second blade, the flap moves from the second position to the first position, and the shutter closes the opening, wherein a plurality of the shutters is disposed in a direction intersecting with the transporting direction at a plurality of positions avoiding an end in a paper width direction of the recording paper, respectively.

* * * * *